(12) United States Patent
Gesteira et al.

(10) Patent No.: US 8,853,310 B2
(45) Date of Patent: Oct. 7, 2014

(54) PROCESS FOR PREPARING A LUBRICATED THERMOPLASTIC POLYMER

(75) Inventors: Giseal Perez Gesteira, Sao Paulo (BR); Antonio Cesar Silva, Santo Andre (BR)

(73) Assignee: Rhodia Poliamida e Especialidades Ltda, Sao Paulo (BR)

( * ) Notice: Subject to any disclaimer, the term of this patent is extended or adjusted under 35 U.S.C. 154(b) by 0 days.

(21) Appl. No.: 13/140,916

(22) PCT Filed: Dec. 11, 2009

(86) PCT No.: PCT/IB2009/007716
§ 371 (c)(1),
(2), (4) Date: Sep. 8, 2011

(87) PCT Pub. No.: WO2010/070409
PCT Pub. Date: Jun. 24, 2010

(65) Prior Publication Data
US 2011/0319562 A1    Dec. 29, 2011

(30) Foreign Application Priority Data

Dec. 19, 2008 (FR) ..................... 08 58830

(51) Int. Cl.
| C08K 5/09 | (2006.01) |
| C04B 35/634 | (2006.01) |
| C08K 5/01 | (2006.01) |
| C08K 5/098 | (2006.01) |
| C08G 69/26 | (2006.01) |
| C08G 69/28 | (2006.01) |
| C10M 169/04 | (2006.01) |

(52) U.S. Cl.
CPC . C08G 69/28 (2013.01); C08K 5/09 (2013.01); C08K 5/01 (2013.01); C08K 5/098 (2013.01); C08G 69/26 (2013.01); C10M 169/04 (2013.01); C10M 2203/1025 (2013.01); C10M 2205/163 (2013.01); C10M 2207/126 (2013.01); C10M 2203/10 (2013.01); C10N 2220/021 (2013.01); C10N 2230/02 (2013.01)
USPC ............ 524/322; 524/879; 524/315; 524/318

(58) Field of Classification Search
None
See application file for complete search history.

(56) References Cited

U.S. PATENT DOCUMENTS

| 3,252,905 A | 5/1966 | Schaeffer | |
| 6,348,563 B1 * | 2/2002 | Fukuda et al. | 528/310 |
| 6,515,058 B1 * | 2/2003 | Tomiyama et al. | 524/322 |
| 2006/0247331 A1 * | 11/2006 | Coffey et al. | 523/351 |
| 2007/0249789 A1 * | 10/2007 | Buehler et al. | 525/420 |

FOREIGN PATENT DOCUMENTS

| EP | 0 065 291 | * 11/1982 |
| EP | 0934979 A | 8/1999 |
| EP | 1179568 A1 | 2/2002 |
| JP | 2000143975 A | 5/2000 |
| JP | 2004091778 A | 3/2004 |
| WO | 2007109042 A1 | 9/2007 |

OTHER PUBLICATIONS

Gwidon W. Stachowiak, Andrew W. Batchelor, Engineering Tribology, 3rd edition p. 670.*
International Search Report dated Apr. 20, 2010 issued in International Application No. PCT/IB2009/007716.

* cited by examiner

*Primary Examiner* — Susannah Chung
*Assistant Examiner* — Robert T Butcher
(74) *Attorney, Agent, or Firm* — Dentons US LLP

(57) ABSTRACT

A method for preparing a lubricated thermoplastic polymer, in particular a lubricated polyamide is described. A method for preparing a lubricated thermoplastic polymer, in particular a lubricated polyamide, according to which a mixture of lubricants is added to the molten polymer during the polymerization process is also described.

10 Claims, No Drawings

PROCESS FOR PREPARING A LUBRICATED THERMOPLASTIC POLYMER

CROSS-REFERENCE TO PRIOR APPLICATIONS

This application is the United States national phase of PCT/IB2009/007716, filed Dec. 11, 2009, and designating the United States (published in the French language on Jun. 24, 2010, as WO 2010/070409 A1; the title and abstract were also published in French), and claims priority under 35 U.S.C. §119 of FR 0858830, filed Dec. 19, 2008, each hereby expressly incorporated by reference in its entirety and each assigned to the assignee hereof.

The invention relates to a process for preparing a lubricated thermoplastic polymer, in particular a lubricated polyamide.

The invention relates more particularly to a process for preparing a lubricated thermoplastic polymer, in particular a lubricated polyamide, according to which at least one lubricant is introduced into the polymer in the melt state during the polymerization process of the polymer.

Thermoplastic polymers, in particular polyamides, are polymers of significant industrial and commercial interest. Thermoplastic polyamides in particular are obtained either by reaction between two different monomers, or by polycondensation of a single monomer. The invention applies, on the one hand, to polyamides derived from two different monomers, the most prominent polyamide of which is polyhexamethylene adipamide. The invention applies, on the other hand, to polyamides derived from a single monomer, the most prominent polyamide of which is polycaprolactam.

The manufacture of polymers, in particular of polyamide type, is mainly carried out by polycondensation starting from monomers, generally by heating an aqueous solution of the monomers at high temperature and pressure.

The polymers thus manufactured, in particular the polyamides, mainly in molten form, are then generally formed into granules.

These granules are then used in a large number of applications, especially for the manufacture of yarns, fibres or filaments, or for shaping articles by moulding, injection moulding or extrusion. They may especially be used in the field of engineering plastics, generally after a formulation step. These granules, in order to be definitively formed into articles such as moulded articles, etc., and in order to be formulated, are generally remelted.

Polyamides are manipulated in the melt state during these forming and formulation operations, which is not always easy. Indeed, polyamides may have a high viscosity in the melt state, and they may adhere, in part, to the surfaces of the installations into which they are introduced, which is problematic.

To overcome this, it is known to add a lubricant to the polymer, in particular to the polyamide.

One method of introducing the lubricant is known, which consists in depositing the lubricant on the polymer granules. The granules are then remelted in order to be shaped. This method is complex and involves, in the process for preparing the lubricated polymer, a supplementary step of depositing the lubricant on the granules, which generates a considerable cost.

Another method of introducing the lubricant consists in introducing the lubricant during a formulation step, by remelting polymer granules and adding the lubricant into the molten polymer. This method is complex, as it involves a step of remelting the polymer.

The invention proposes a simple and economic process that does not exhibit the above drawbacks.

For this purpose, the invention proposes a process of preparing a lubricated thermoplastic polymer, in particular lubricated polyamide, at least one lubricant being introduced into the polymer in the melt state during the polymerization process of the polymer.

The term "polymer" is understood to mean a polymer or a prepolymer. This term excludes monomers.

By way of example, mention may be made, as a suitable thermoplastic (co)polymer within the context of the invention, of: polyolefins, polyesters, polyalkylene oxides, polyoxyalkylenes, polyhaloalkylenes, polyalkylenephthalates or polyalkylene-terephthalates, polyphenyls or polyphenylenes, polyphenylene oxide or polyphenylene sulphide, polyvinyl acetates, polyvinyl alcohols, polyvinyl halides, polyvinylidene halides, nitrile polyvinyls, polyamides, polyimides, polycarbonates, acrylic or methacrylic acid polymers, polyacrylates or polymethacrylates, natural polymers such as cellulose and derivatives thereof, synthetic polymers such as synthetic elastomers, or thermoplastic copolymers comprising at least one monomer identical to any one of the monomers included in the aforementioned polymers, and also blends and/or alloys of all these (co)polymers.

As other preferred thermoplastic polymers of the invention, mention may be made of semicrystalline or amorphous polyamides, such as aliphatic polyamides, semi-aromatic polyamides and, more generally, linear polyamides obtained by polycondensation between an aliphatic or aromatic saturated diacid and an aromatic or aliphatic saturated primary diamine, polyamides obtained by condensation of a lactam or of an amino acid or linear polyamides obtained by condensation of a mixture of these various monomers.

More specifically, these copolyamides may be, for example, polyhexamethylene adipamide, polyphthalamides obtained from terephthalic and/or isophthalic acid such as the polyamide sold under the trade name AMODEL, or the copolyamides obtained from adipic acid, hexamethylene diamine and caprolactam.

The thermoplastic polymer may be a polyester, such as polyethylene terephthalate (PET), polypropylene terephthalate (PPT), polybutylene terephthalate (PBT), and copolymers and blends thereof.

More preferably still, the thermoplastic polymer is chosen from the group of (co)polyamides comprising: polyamide 6, polyamide 6,6, polyamide 4, polyamide 11, polyamide 12, polyamides 4/6, 6/10, 6/12, 6/36, 12/12 and copolymers and blends thereof.

The lubricant is a mixture of paraffin, fatty acid and fatty acid metal salt. The paraffins are in the form of pure substances or of industrial mixtures. They may be hydrocarbon oils or waxes. They are generally saturated or unsaturated aliphatic hydrocarbon-based compounds. Advantageously, the paraffin has an average number of carbon atoms between 20 and 500, advantageously between 30 and 200.

The fatty acids and the fatty acid metal salts may be saturated or unsaturated.

As fatty acids which may be suitable within the context of the invention, mention may be made of the fatty acids comprising at least 16 carbon atoms. As examples of such fatty acids, mention may be made of lauric acid, myristic acid, palmitic acid, stearic acid, alginic acid, behenic acid, lignoceric acid, serotinic acid, melissic acid and eicosanoic acid. Stearic acid is preferred.

The fatty acids are advantageously monovalent or divalent carboxylic acids having 6 to 24 carbon atoms. Among these acids, mention may be made of pelargonic acid, margaric acid and dodecanedicarboxylic acid.

The fatty acid metal salt may be a metal salt of the fatty acid as described above. As examples of fatty acid metal salts, mention may be made of aluminium, calcium, magnesium or zinc stearate. Mention may also be made of aluminium distearate, aluminium tristearate, etc.

Advantageously, the proportion of lubricant by weight relative to the weight of polymer is between 0.1 and 5%, preferably it is between 0.2 and 2%, and more preferably still it is between 0.5 and 1.5%. The choice of this proportion is easily determined by routine tests.

The lubricant may be introduced in various forms into the polymer in the melt state. It may, for example, be introduced in liquid form, for example when the lubricant is liquid at ambient temperature, or it may be melted.

It may also be introduced in solid form, for example in the form of a masterbatch.

In the lubricant, mixture of several components, according to the invention, certain components may be in solid form and others in liquid form.

The lubricant is introduced into the polyamide in the melt state according to any method known to a person skilled in the art for introducing an additive into a polymer in the melt state.

The process of the invention relates, in particular, to the manufacture of all types of polyamides or polyamide-based copolymers. It is, for example, effective for the manufacture of polyamides resulting from the polymerization of lactams or of amino acids, such as caprolactam or 6-amino hexanoic acid, or for the manufacture of polyamides resulting from the polymerization between monomers of carboxylic diacids and of diamines. It is in particular effective for the condensation of adipic acid and of hexamethylene diamine. It is suitable for the manufacture of any polyamide-based composition and of any polyamide-based copolymer.

The polymer may be in the form of a composition based on the polymer as matrix and comprising additives such as antifoaming agents, etc. These additives are known to a person skilled in the art.

Moreover, chain limiters may be introduced during the process of the invention. By way of example of chain limiters, mention may be made of acetic acid, benzoic acid, etc.

The composition may also comprise other compounds, such as mattifying agents for instance titanium dioxide or zinc sulphide, heat or light stabilizers, bioactive agents and anti-soiling agents. This list is in no way exhaustive.

Polymerizations starting from monomers of carboxylic diacids and of diamines generally comprise three steps. The first step is the concentration of a carboxylate-ammonium di-salt in the water, known as "N salt". This step is followed by an amidation (condensation of the acid and amine functions) generally comprising the following phases: a pressurized distillation phase and a decompression phase. The condensation is then continued under atmospheric pressure (or under vacuum) up to the desired degree of polymerization. This final step is known as finishing. The polymer is generally then extruded or shaped.

Polymerizations starting from lactams and amino acids, in particular the manufacture of polyamide 6, may comprise a step of mixing monomers with water and optionally chain limiters, a heating step, optionally a pressure increase step followed by a decompression step, optionally a vacuum finishing step, generally a step of granulation of the product obtained, an extraction step and a drying step.

For the manufacture of polyester, the polymerization may comprise a mixing step, a transesterification or esterification step, optionally a concentration step and a vacuum polycondensation step.

According to one particular embodiment of the process of the invention, the process may comprise a polycondensation carried out in the molten phase comprising the solution of N salt or the liquid comprising the monomers, the reaction stream flowing at low speed in the lower part of a reactor having a horizontal axis or in a tubular device. The polycondensation reaction is thus carried out at a pressure of around 5-30 bar at a temperature of around 215-300° C. The reaction stream then undergoes a non-adiabatic expansion to atmospheric pressure by passing into a flasher, that is to say a heated tubular device having a sufficient exchange surface area to prevent crystallization of the product. In the course of this operation, residual water contained in the stream of material is vaporized. The vapour and the liquid stream may then be separated in a gas/liquid separator. The polycondensation is continued in the molten phase at atmospheric or reduced pressure so as to achieve the desired degree of progression, in a finisher. The residence time in the liquid-phase finishing device is preferably greater than or equal to 5 minutes.

Advantageously, the process of the invention comprises a pressurized distillation phase and a decompression phase and the lubricant is introduced after the pressurized distillation phase, preferably it is introduced after the decompression phase.

According to one particular embodiment of the process of the invention, the process comprises a finishing step comprising a finishing device (also known as a finisher) and the lubricant is introduced before the outlet of the finishing device.

Advantageously, the decompression phase is carried out by passing into a flasher, and the lubricant is introduced at the inlet of the flasher.

According to one preferred embodiment of the process of the invention, the lubricant is introduced at the inlet or at the outlet of the finishing device.

The expression "before the outlet of the finishing device" is understood to mean that the introduction of the lubricant takes place in the finishing device before the end of this device.

The expression "at the inlet of the flasher" is understood within the meaning of the present invention to mean that the introduction of the lubricant takes place at the beginning of the decompression step by passing into the flasher.

The expression "at the inlet of the finishing device" is understood within the meaning of the present invention to mean that the introduction of the lubricant takes place in the finishing device at the start of this device.

The expression "at the outlet of the finishing device" will be understood to mean that the introduction of the lubricant takes place in the finishing device at the end of this device.

Mixing means may be used during the implementation of the process of the invention. These means are known to a person skilled in the art.

Advantageously, the polymer has not undergone a remelting step when the lubricant is introduced.

Thus, the process of the invention makes it possible to obtain a lubricated polymer, in particular a lubricated polyamide, simply and economically. Indeed, it especially makes it possible to obtain granules of lubricated polymer, in particular of lubricated polyamide, without a supplementary step of depositing lubricant on the granules. The polymer granules obtained according to the process of the invention are already lubricated, and they may be directly formulated and/or shaped, without a supplementary lubrication step. This represents a considerable advantage.

Furthermore, the lubricant is introduced late, preferably as late as possible, during the polymerization process. This makes it possible to retain great flexibility of the polymerization unit: specifically, the late addition of the lubricant makes it possible to continue to produce a large number of different polymer grades (for example with or without lubricant) in one and the same polymerization unit. An early introduction of lubricant could generate pollution of the installations during changes of the grade of polymer to be produced, which is not desirable. Finally, introducing the lubricant late makes it possible to limit the interferences with the polymerization process.

The process of the invention may be continuous or in batch mode. Preferably, the process of the invention is a continuous process.

The lubricated polymer, in particular the lubricated polyamide of the invention may be used for manufacturing articles, such as yarns, fibres and/or filaments, films and moulded articles. The lubricated polymer may be formed into articles directly after the polymerization, without intermediate steps of solidification and of remelting. It may also be formed into granules, intended to undergo remelting for subsequent definitive shaping, for example for the manufacture of moulded articles or for the manufacture of yarns, fibres and/or filaments.

Another subject of the present invention is a lubricated thermoplastic polymer capable of being obtained by the process of the invention comprising a pressurized distillation phase, a decompression phase and a finishing step using a finishing device and in which the lubricant is introduced after the pressurized distillation phase and before the outlet of the finishing device.

The lubricated polymer of the invention is advantageously capable of being obtained by the process of the invention in which the lubricant is introduced after the decompression step.

According to a first mode, the lubricated polymer of the invention is capable of being obtained by the process of the invention in which the decompression phase takes place by passing into a flasher, and in which the lubricant is introduced at the inlet of the flasher.

According to a second mode, the lubricated polymer of the invention is capable of being obtained by the process of the invention in which the lubricant is introduced at the inlet or at the outlet of the finishing device.

The lubricated thermoplastic polymer according to the invention has advantageous technical characteristics, especially a low viscosity number, advantageously a viscosity number between 105 and 125 ml/g defined according to the measurement of the flow times, at 25° C., of a polyamide solution having a weight content of 5 g/l in 90% formic acid.

Other details or advantages of the invention will appear more clearly in light of the examples given below.

EXAMPLES

Tests carried out on the polymers:
The first test is the measurement of the viscosity number according to the measurement of the flow times, at 25° C., of a polyamide solution having a weight content of 5 g/l in 90% formic acid. The second test is the measurement of the concentration of end groups, in mmol/kg, by potentiometric analysis. These tests are carried out starting from granules.

Example 1

A solution of nylon salt is introduced into an evaporator where some of the water is removed. The thus concentrated solution of nylon salt then feeds a tubular reactor heated at 280° C. by virtue of a heat transfer fluid. The polycondensation reaction takes place and forms a prepolymer that still contains water that must be removed. A mixture of prepolymer and of water vapour forms and is conveyed to a vertical finisher where the separation of the water vapour and prepolymer takes place and where the reaction continues.

Introduced at the inlet of the finisher is a liquid paraffin also known as "white mineral oil" (CAS number 8042-47-5) at ambient temperature.

The finisher works with a flow rate of 700 kg/h of PA-6,6. It is stirred and heated at 280° C. by a heat-transfer fluid. A portion of the mixing of the liquid paraffin in the polymer occurs in the finisher. By virtue of a gear pump, the polymer containing the liquid paraffin is transferred to a die block. Downstream of the pump, a mixture of polyamide 6,6 and of lubricants dispersed in this polyamide is added to the polymer containing the liquid paraffin. These lubricants are stearic acid and aluminium stearate.

The rods that exit the die are cooled and cut through a granulation system. The granules are intended for conversion in the form of moulded parts, yarns or fibres.

The polymer PA-6,6 obtained has a viscosity number in 90% formic acid of 135 mg/l.

Example 2

A solution of nylon salt is introduced into an evaporator where some of the water is removed. The thus concentrated solution of nylon salt then feeds a tubular reactor heated at 280° C. by virtue of a heat transfer fluid. The polycondensation reaction takes place and forms a prepolymer that still contains water that must be removed. A mixture of prepolymer and of water vapour forms and is conveyed to a vertical finisher where the separation of the water vapour and prepolymer takes place and where the reaction continues.

Introduced at the inlet of the finisher is a lubricant mixture comprising liquid paraffin also known as "white mineral oil" (CAS number 8042-47-5), stearic acid and aluminium stearate.

The finisher works with a flow rate of 700 kg/h of PA-6,6. It is stirred and heated at 280° C. by a heat-transfer fluid. A portion of the mixing of the lubricants in the polymer occurs in the finisher. By virtue of a gear pump, the polymer containing the lubricants is transferred to a die block.

The rods that exit the die are cooled and cut through a granulation system. The granules are intended for conversion in the form of moulded parts, yarns or fibres.

The polymer PA-6,6 obtained has a viscosity number in 90% formic acid of 118 mg/l.

Example 3

A solution of nylon salt is introduced into an evaporator where some of the water is removed. The thus concentrated solution of nylon salt then feeds a tubular reactor heated at 280° C. by virtue of a heat transfer fluid. The polycondensation reaction takes place and forms a prepolymer that still contains water that must be removed. A mixture of prepolymer and of water vapour forms and is conveyed to a vertical finisher where the separation of the water vapour and prepolymer takes place and where the reaction continues.

Introduced is a lubricant mixture comprising liquid paraffin also known as "white mineral oil" (CAS number 8042-47-5), stearic acid and aluminium stearate downstream of the gear pump placed downstream of the finisher.

The finisher works with a flow rate of 700 kg/h of PA-6,6. It is stirred and heated at 280° C. by a heat-transfer fluid. The gear pump transfers the lubricated polymer to a die block.

The rods that exit the die are cooled and cut through a granulation system. The granules are intended for conversion in the form of moulded parts, yarns or fibres.

The polymer PA-6,6 obtained has a viscosity number in 90% formic acid of 135 mg/l.

Example 4

A solution of nylon salt is introduced into an evaporator where some of the water is removed. The thus concentrated solution of nylon salt then feeds a tubular reactor heated at 250° C. by virtue of a heat transfer fluid. The polycondensation reaction takes place and forms a prepolymer that still contains water that must be removed. The prepolymer is then conveyed into a flasher and heated to 280° C. A mixture of prepolymer and of water vapour forms and is conveyed to a horizontal finisher where the separation of the water vapour and prepolymer takes place and where the reaction continues.

A lubricant mixture comprising liquid paraffin also known as "white mineral oil" (CAS number 8042-47-5), stearic acid and aluminium stearate is introduced through an opening located on the top of the horizontal finisher at the outlet of the finisher.

The finisher works with a flow rate of 900 kg/h of PA-6,6. It is stirred and heated at 280° C. by a heat-transfer fluid. A portion of the dispersion of the lubricant mixture in the polymer occurs in the finisher. By virtue of a gear pump, the polymer containing the lubricant mixture is transferred to a die block.

The rods that exit the die are cooled and cut through a granulation system. The granules are intended for conversion in the form of moulded parts, yarns or fibres.

Example 5

A solution of nylon salt is introduced into an evaporator where some of the water is removed. The thus concentrated solution of nylon salt then feeds a tubular reactor heated at 250° C. by virtue of a heat transfer fluid. The polycondensation reaction takes place and forms a prepolymer that still contains water that must be removed. The prepolymer is then conveyed into a flasher and heated to 280° C. A mixture of prepolymer and of water vapour forms and is conveyed to a horizontal finisher where the separation of the water vapour and prepolymer takes place and where the reaction continues. A lubricant mixture comprising liquid paraffin also known as "white mineral oil" (CAS number 8042-47-5), stearic acid and aluminium stearate is introduced through a valve box placed upstream of the flasher (decompression device located upstream of the finisher).

The flasher works with a flow rate of 900 kg/h of PA-6,6. Downstream of the flasher, the lubricated prepolymer enters into the finisher where the last step of the polycondensation takes place. The homogenization of the lubricant mixture in the prepolymer then the polymer takes place in the flasher and the finisher. By virtue of a gear pump, the lubricated polymer is transferred to a die block.

The rods that exit the die are cooled and cut through a granulation system. The granules are intended for conversion in the form of moulded parts, yarns or fibres.

The polymer PA-6,6 obtained has a viscosity number in 90% formic acid of 110 mg/l.

Example 6

A solution of nylon salt is introduced into an evaporator where some of the water is removed. The concentrated nylon salt is then transferred to a reactor operating in batch mode and gradually heated up to 280° C. by virtue of a heat-transfer fluid and according to a pressure profile that breaks down into three steps: constant pressure (reaction with distillation of water), decompression, atmospheric pressure (finishing of the reaction). The polycondensation reaction takes place in the reactor.

Through a hatch placed on top of the reactor, a lubricant mixture comprising liquid paraffin also known as "white mineral oil" (CAS number 8042-47-5), stearic acid and aluminium stearate is introduced at the beginning of the finishing step, at atmospheric pressure. The reactor operates, with stirring, in 500 kg batches of PA-6,6. The homogenization of the lubricant mixture in the reactor takes place by virtue of the stirring. After the finishing step, the lubricated polymer is extruded through a die block.

The rods that exit the die are cooled and cut through a granulation system. The granules are intended for conversion in the form of moulded parts, yarns or fibres.

The polymer PA-6,6 obtained has a viscosity number in 90% formic acid of 123 mg/l.

Example 7

A solution of nylon salt is introduced into an evaporator where some of the water is removed. The thus concentrated solution of nylon salt then feeds a tubular reactor heated at 250° C. by virtue of a heat transfer fluid. The polycondensation reaction takes place and forms a prepolymer that still contains water that must be removed. The prepolymer is then conveyed into a flasher and heated to 280° C. A mixture of prepolymer and of water vapour forms and is conveyed to a horizontal finisher where the separation of the water vapour and prepolymer takes place and where the reaction continues.

A lubricant mixture comprising liquid paraffin also known as "white mineral oil" (CAS number 8042-47-5), stearic acid and aluminium stearate is introduced through an opening located on the top of the horizontal finisher at the inlet of the finishing device.

The flasher works with a flow rate of 900 kg/h of PA-6,6. Downstream of the flasher, the lubricated prepolymer enters into the finisher where the last step of the polycondensation takes place. The homogenization of the lubricant mixture in the prepolymer then the polymer takes place in the flasher and the finisher. By virtue of a gear pump, the lubricated polymer is transferred to a die block.

The rods that exit the die are cooled and cut through a granulation system. The granules are intended for conversion in the form of moulded parts, yarns or fibres.

The polymer PA-6,6 obtained has a viscosity number in 90% formic acid of 118 mg/l and its amine end groups (AEG) and carboxylic end groups (CEG) measured by potentiometric analysis attain the respective values of 35 and 95 mmol/kg.

Example 8

A solution of nylon salt is introduced into an evaporator where some of the water is removed. The thus concentrated solution of nylon salt then feeds a tubular reactor heated at 250° C. by virtue of a heat transfer fluid. The polycondensation reaction takes place and forms a prepolymer that still contains water that must be removed. The prepolymer is then conveyed into a flasher and heated to 280° C. A mixture of prepolymer and of water vapour forms and is conveyed to a horizontal finisher where the separation of the water vapour and prepolymer takes place and where the reaction continues.

A lubricant mixture comprising liquid paraffin also known as "white mineral oil" (CAS number 8042-47-5), stearic acid and aluminium stearate is introduced through a valve that gives access to the inside of the polymer outlet pipe (after the finisher).

The flasher works with a flow rate of 900 kg/h of PA-6,6. Downstream of the flasher, the lubricated prepolymer enters into the finisher where the last step of the polycondensation takes place. The homogenization of the lubricant mixture in the prepolymer then the polymer takes place in the flasher and the finisher. By virtue of a gear pump, the lubricated polymer is transferred to a die block.

The rods that exit the die are cooled and cut through a granulation system. The granules are intended for conversion in the form of moulded parts, yarns or fibres.

The polymer PA-6,6 obtained has a viscosity number in 90% formic acid of 130 mg/l and its amine end groups (AEG) and carboxylic end groups (CEG) measured by potentiometric analysis attain the respective values of 34 and 87 mmol/kg.

The invention claimed is:

1. A process for preparing a lubricated thermoplastic polymer, the process comprising
   (i) concentrating at least one monomer in water to form a molten phase comprising the at least one monomer;
   (ii) polymerizing the at least one monomer with a pressurized distillation phase and a decompression phase to form a polymer in the melt state; and
   (iii) introducing a lubricant:
      (a) into the polymer in the melt state or
      (b) into the molten phase comprising monomers that form a polymer during polymerization,
      wherein the lubricant is a mixture of a paraffin, a fatty acid and a fatty acid metal salt,
      and wherein the lubricant is the only lubricant introduced into the polymer or into the molten phase,
   wherein the thermoplastic is a polyamide
   wherein the process does not include a supplementary step of depositing lubricant on granules.

2. The process according to claim 1, wherein the paraffin has an average number of carbon atoms which is between 20 and 500.

3. The process according to claim 1, wherein the lubricant is in an amount of between 0.1 and 5% by weight relative to the weight of polymer.

4. The process according to claim 1, wherein the process further comprises a finishing step comprising use of a finishing device having an inlet and an outlet, wherein the lubricant is introduced before the outlet of the finishing device.

5. The process according to claim 1, wherein the lubricant is introduced after the decompression phase.

6. The process according to claim 1, wherein the decompression phase is carried out with a flasher having an inlet, and wherein the lubricant is introduced at the inlet of the flasher.

7. The process according to claim 1, wherein the process further comprises a finishing step comprising use of a finishing device having an inlet and an outlet, wherein the lubricant is introduced at the inlet or at the outlet of the finishing device.

8. The process according to claim 1, wherein the polymer, when the lubricant is introduced, has not undergone a remelting step.

9. The process according to claim 2, wherein the paraffin has an average number of carbon atoms which is between 30 and 200.

10. A process for preparing a lubricated thermoplastic polymer, the process comprising
   (i) concentrating at least one monomer in water to form a molten phase comprising the at least one monomer;
   (ii) polymerizing the at least one monomer with a pressurized distillation phase and a decompression phase to form a polymer in the melt state; and
   (iii) introducing a lubricant:
      (a) into the polymer in the melt state or
      (b) into the molten phase comprising monomers that form the polymer during polymerization,
      wherein the lubricant consists essentially of a mixture of a paraffin, a fatty acid and a fatty acid metal salt,
      and wherein the lubricant is the only lubricant introduced into the polymer or into the molten phase,
   wherein the thermoplastic polymer is a polyamide,
   wherein the process does not include a supplementary step of depositing lubricant on granules.

* * * * *